US012653092B2

(12) United States Patent   (10) Patent No.: US 12,653,092 B2
Horngacher et al.                (45) Date of Patent:      Jun. 16, 2026

(54) METHOD AND SYSTEM FOR OPERATING AN AUTONOMOUS MOBILE GREEN SPACE PROCESSING ROBOT

(71) Applicant: Andreas Stihl AG & Co. KG, Waiblingen (DE)

(72) Inventors: Christian Horngacher, Kirchberg (AT); Philip Wolf, Ebbs (AT); Alexander Biechl, Kufstein (AT); Alexander Rieger, Neubeuern (DE); Christoph Steinlechner, Schwoich (AT); Peter Ritzer, Ebbs (AT); Michael Reitter, Kufstein (AT); Tobias Mueller, Woergl (AT)

(73) Assignee: Andreas Stihl AG & Co. KG, Waiblingen (DE)

( * ) Notice: Subject to any disclaimer, the term of this patent is extended or adjusted under 35 U.S.C. 154(b) by 242 days.

(21) Appl. No.: 18/530,621

(22) Filed: Dec. 6, 2023

(65) Prior Publication Data

US 2024/0188484 A1     Jun. 13, 2024

(30) Foreign Application Priority Data

Dec. 7, 2022    (EP) ..................................... 22212029

(51) Int. Cl.
  *A01D 34/00*        (2006.01)
  *A01D 34/74*        (2006.01)
      (Continued)

(52) U.S. Cl.
  CPC ........... *A01D 34/008* (2013.01); *G05D 1/639* (2024.01); *A01D 34/74* (2013.01); *A01D 75/185* (2013.01);
      (Continued)

(58) Field of Classification Search
  CPC .... A01D 34/008; A01D 34/74; A01D 75/185; A01D 2101/00; G05D 1/639; G05D 2107/23
  See application file for complete search history.

(56)          References Cited

U.S. PATENT DOCUMENTS 7,539,557 B2 *  5/2009  Yamauchi ............ G05D 1/0251
                                        700/262
2008/0109126 A1 *  5/2008  Sandin .................... B60L 50/51
                                        56/229
          (Continued)

FOREIGN PATENT DOCUMENTS

DE      10 2018 222 136 A1     6/2020
DE      10 2021 100 122 A1     7/2021
          (Continued)

*Primary Examiner* — Jay Khandpur
(74) *Attorney, Agent, or Firm* — Crowell & Moring LLP

(57)          ABSTRACT

A method for operating an autonomous mobile green space processing robot, wherein the green space processing robot includes a drive system for propulsion of the green space processing robot. The method includes: a) monitoring whether a sticking presumption criterion is met, wherein the sticking presumption criterion is characteristic of suspected sticking of the green space processing robot; b) if the sticking presumption criterion is met, operating the drive system for a movement change of the green space processing robot and monitoring whether a sticking confirmation criterion is met, wherein the sticking confirmation criterion is that the movement change does not occur; and c) if the sticking confirmation criterion is met, initiating a sticking countermeasure of the green space processing robot.

14 Claims, 5 Drawing Sheets

(51) Int. Cl.
    *A01D 75/18*      (2006.01)
    *A01D 101/00*    (2006.01)
    *G05D 1/639*     (2024.01)
    *G05D 107/20*   (2024.01)

(52) U.S. Cl.
    CPC ..... *A01D 2101/00* (2013.01); *G05D 2107/23*
                                        (2024.01)

(56) References Cited

U.S. PATENT DOCUMENTS

2012/0029752 A1 * 2/2012 Johnson ................. G05D 1/027
                                                  901/1
2025/0302264 A1 * 10/2025 Chen ................... A47L 11/4083

FOREIGN PATENT DOCUMENTS

EP      2 412 222 A2    2/2012
EP      1 996 987 B1    10/2018
WO   WO-2007140930 A1 * 12/2007  .......... A01D 34/008

* cited by examiner

———— movement specification, SG

– – – – measurement from acceleration sensor —► blocked, FBK: ✓

— · — · measurement from acceleration sensor —► not blocked, FBK: X

METHOD AND SYSTEM FOR OPERATING AN AUTONOMOUS MOBILE GREEN SPACE PROCESSING ROBOT

CROSS REFERENCE TO RELATED APPLICATION

This application claims priority under 35 U.S.C. §119 from European Patent Application No. 22212029.7, filed Dec. 7, 2022, the entire disclosure of which is herein expressly incorporated by reference.

BACKGROUND AND SUMMARY

The invention relates to a method and a system, in particular for operating, in each case, an autonomous mobile green space processing robot.

The invention is based on the object of providing a method and a system, in particular for operating, in each case, an autonomous mobile green space processing robot which has improved properties.

The invention achieves this object by providing a method and a system described in the independent claims. Advantageous refinements and/or embodiments of the invention are described in the dependent claims.

The method according to the invention is for operating an autonomous mobile green space processing robot. The green space processing robot includes a drive system. The drive system is designed for propulsion of the green space processing robot, in particular on a green space. The method has the following steps: a) monitoring whether one, in particular at least or only one, in particular one single, sticking presumption criterion is met. The sticking presumption criterion is characteristic of suspected sticking of the green space processing robot; b) if, in particular at least or only, the sticking presumption criterion is met, operating the drive system for a movement change of the green space processing robot and monitoring whether one, in particular at least or only one, in particular one single, sticking confirmation criterion is met. The sticking confirmation criterion is that the movement change does not occur, in particular with a minimum value or extent; c) if, in particular at least or only, the sticking confirmation criterion is met, initiating a sticking countermeasure of the green space processing robot.

This, in particular this second step b) or this second stage, enables the suspected sticking, in particular detected by means of the first step a) or this first stage, to be confirmed and thus reliable, in particular two-stage, detection of the sticking, in particular the actual sticking. This therefore enables avoiding unnecessary initiation of the sticking countermeasure. This therefore enables energy consumption and/or logic capacities to be kept low. This is because operating for the movement change can in particular have a lower energy consumption and/or lower logic capacities in comparison to initiating the sticking countermeasure. Additionally or alternatively, initiating the sticking countermeasure enables the sticking to be released and therefore the green space processing robot to be freed.

In particular, the method, the operating, the monitoring, and/or the initiating can be automatic and/or computer-implemented and/or executed by means of a monitoring and operating device, in particular of the green space processing robot.

Autonomous mobile green space processing robot can mean that the green space processing robot can be designed to propel itself automatically or independently or in a self-controlled manner and/or independently of a user, in particular on the green space, which can be specified and/or bounded, and/or to process, in particular the green space, in particular to begin and/or end the processing automatically or independently or in a self-controlled manner and/or independently of the user.

The green space processing robot can include a processing tool, in particular a cutting tool, in particular wherein the processing tool can be designed for processing the green space.

The green space can be a meadow.

The green space processing robot and/or the drive system can be electrical.

The drive system can include, in particular can be, a propulsion drive system and/or a motor drive system.

The term "comprises" or "has" can be used synonymously for the term "includes".

The term "configured" or "set up" can be used synonymously for the term "designed".

The term "identify" or "detect" or "check" can be used synonymously for the term "monitor".

The term "getting stuck" or "getting bogged down" can be used synonymously for the term "sticking".

The sticking of the green space processing robot can be with a contact part or contact element, in particular the processing tool, and/or on an obstacle, in particular a hill. In particular, the contact part and/or the processing tool can be arranged on an underside of the green space processing robot, in particular spatially.

The term "suspicion" can be used synonymously for the term "presumption".

The term "characterizing" can be used synonymously for the term "characteristic".

The term "control" or "activate" can be used synonymously for the term "operate". Additionally or alternatively, the operation can be targeted.

The sticking presumption criterion and the sticking confirmation criterion can be different, in particular of different types. Additionally or alternatively, the sticking presumption criterion and/or the movement change and/or the sticking confirmation criterion can be specified, in particular at the factory.

The movement change can include, in particular be, an acceleration, in particular a velocity value change, and/or a rotation or direction change, in particular with a constant velocity value. Additionally or alternatively, the movement change can be a change of the propulsion. Further additionally or alternatively, minimum value can mean at least 10% (percent), in particular at least 50%, in particular at least 90%, of a target or expected value.

Step b) can be designated as the intentional manipulation of the velocity (for example, the forward velocity) of the green space processing robot or provoked stimulation of the green space processing robot and as a check of a response of the green space processing robot.

If the sticking presumption criterion is not met, in particular is no longer met, step b) does not have to be or cannot be executed, in particular the drive system does not have to be or cannot be operated for the movement change. In particular, step a) can be executed.

If the sticking confirmation criterion is not met, in particular is no longer met, step c) does not have to be or cannot be executed, in particular the sticking countermeasure does not have to be or cannot be initiated. In particular, step a) can be executed.

The term "release" or "freeing" can be used synonymously for the term "counter".

The term "trigger" or "execute" can be used synonymously for the term "initiate".

The monitoring, the operation, and/or the initiation can be executed by means of the green space processing robot. In particular, the monitoring can be executed by means of a sensor, in particular at least one sensor, in particular electrical sensor, of the green space processing robot. In particular, the sensor can be independent of the drive system.

Step a) can be executed repeatedly, in particular multiple times, and/or continuously or progressively.

Step b) can be executed chronologically after step a).

Step c) can be executed chronologically after step b).

In one refinement of the invention, the green space processing robot is a lawnmowing robot, in particular including a lawnmowing tool. This method enables special advantages for such a green space processing robot. In particular, the green space processing robot can be a mulching mower robot. Additionally or alternatively, the lawnmowing tool can comprise at least one mowing string, at least one plastic cutter, at least one metal cutter, and/or a metal cutting blade having at least one cutting edge and/or having at least one cutting tooth. Further additionally or alternatively, the lawnmowing tool can be designed as a rotating lawnmowing tool and for the purpose of mowing a material to be mowed in the so-called free cutting method without counter cutting edge. Further additionally or alternatively, the lawnmowing tool can be designed for mowing the green space. Further additionally or alternatively, the green space can be a lawn.

In one refinement of the invention, the green space processing robot is designed as a drivable green space processing robot. Additionally or alternatively, the drive system includes a traction drive system. In particular, the drive system is the traction drive system. The traction drive system is designed for a driving movement of the green space processing robot. This enables particularly advantageous propulsion.

In one refinement of the invention, step a) includes: operating the drive system for the propulsion of the green space processing robot. In particular, step b) includes: changed or different operation of the drive system. This, in particular this step a), enables the processing. In particular, the propulsion can be specified, in particular at the factory.

In one refinement, in particular one embodiment, of the invention, the sticking presumption criterion is that a, in particular the, propulsion, in particular with a minimum value or extent, of the green space processing robot cannot be inferred, in particular in spite of the operation of the drive system for the propulsion, in particular a bumper of the green space processing robot does not bump and/or a distance, a position, a route, and/or an inclination of the green space processing robot does/do not change and/or the green space processing robot does not experience a rotation rate and/or an acceleration, in particular within a specified period of time. This enables particularly good identification of the sticking, in particular the suspected sticking. In particular, in spite of the operation can mean in spite of a drive torque, in particular a maximum drive torque, greater than zero and/or a drive current, in particular a maximum drive current, greater than zero which causes the drive torque. Additionally or alternatively, the bumper can be a part of a cover hood of the green space processing robot. Further additionally or alternatively, the distance can be in relation to an object, in particular an immobile object, such as a wall and/or a boundary wire. Further additionally or alternatively, the period of time can be specified at the factory and/or can be at least 10 s (seconds), in particular at least 20 s, in particular at least 60 s, in particular at least 120 s, and/or at most 3600 s, in particular at most 1200 s, in particular at most 600 s, in particular at most 300 s, in particular at most 150 s. Further additionally or alternatively, the term "time interval" can be used synonymously for the term "period of time".

In one refinement, in particular one embodiment, of the invention, the monitoring of step a) and/or step b) is executed by means of a bumper sensor, a distance sensor, in particular an ultrasonic sensor and/or a magnetic field sensor, a position sensor, in particular a global and/or local position sensor, an odometry sensor, in particular a visual odometry sensor, an inclination sensor, a rotation rate sensor, and/or an acceleration sensor of the green space processing robot. This enables particularly good monitoring. In particular, a magnetic field, in particular an amplitude and/or a phase of the magnetic field, can be caused by an electric current flowing through the boundary wire. Additionally or alternatively, the global position sensor can include a satellite position determination receiver, in particular can be the satellite position determination receiver, for example for GNSS. Further additionally or alternatively, the rotation rate sensor and/or the acceleration sensor can be part of an inertial sensor.

In one refinement of the invention, the operation of the drive system for the movement change is executed using a negative stroke of a target velocity, in particular from at most $-0.6$ m/s (meters per second), in particular at most $-0.3$ m/s, and using a target braking ramp, in particular of at most $-4$ m/s$^2$ (meters per second per second), in particular at most $-2$ m/s$^2$. This, in particular the relatively strong deceleration, enables particularly good confirmation of the suspected sticking. In particular, the movement change does not have to include a rotation, in particular be a rotation. Additionally or alternatively, the negative stroke can be at least $-0.05$ m/s and/or the target braking ramp can be at least $-0.05$ m/s$^2$.

In one refinement of the invention, the operation of the drive system for the movement change and the sticking countermeasure are different, in particular qualitatively and/or quantitatively, in particular of different types. In particular, quantitatively different can mean at least 50% different, in particular at least 75%, in particular at least 100%, in particular at least 200%.

In one refinement of the invention, the green space processing robot includes a, in particular the, processing tool. A processing height, in particular a value of the processing height, of the processing tool is adjustable. The sticking countermeasure includes: increasing the processing height. Additionally or alternatively, the sticking countermeasure includes, in particular chronologically after increasing the processing height: operating the drive system for a greater movement change, in particular twice as great, of the green space processing robot, in particular in a modified, in particular opposite, propulsion direction. Further additionally or alternatively, the sticking countermeasure includes, in particular chronologically after the operation of the drive system for the greater movement change: outputting and/or transmitting user-perceptible sticking information. This enables—in particular increasing the processing height and/or operating the drive system for the greater movement change enables/enable—releasing the sticking and thus freeing the green space processing robot, in particular without the user. Additionally or alternatively, this, in particular outputting and/or transmitting the user-perceptible sticking information, enables releasing the sticking and thus freeing the green space processing robot by way of the user, in particular if increasing the processing height and/or operating the drive system for the greater movement change does/do not release the sticking. In particular, the term "tool height", in particular "cutting height" or "lawnmowing height", can be used synonymously for the term "processing height".

Additionally or alternatively, the green space processing robot can include or define a driving level, wherein the processing height can be above the driving level. Further additionally or alternatively, it can be adjustable in at least three steps or continuously adjustable. Further additionally or alternatively, the processing height can be adjustable in a range from 0 cm (centimeters), in particular 2.5 cm, in particular 5 cm, to 20 cm, in particular 15 cm, in particular 10 cm, in particular outward from the green space and/or the driving level. Further additionally or alternatively, the increase of the processing height can be maximum and/or in an upper stop limit. Further additionally or alternatively, the wording "raising the processing tool" can be used synonymously for the wording "increasing the processing height". Further additionally or alternatively, the green space processing robot can be designed such that the increase of the processing height can be independent of the propulsion of the green space processing robot. Further additionally or alternatively, the increase can be executed by means of a height adjustment device, which is in particular electrical, of the green space processing robot. In particular, the height adjustment device can be independent of the drive system and/or the sensor.

Further additionally or alternatively, the increase, the output, and/or the transmission can be automatic. Further additionally or alternatively, the greater movement change can include, in particular can be, a rotation. Further additionally or alternatively, the propulsion direction can be modified in relation to, in particular opposite to, a propulsion direction chronologically before meeting the sticking presumption criterion and/or the sticking confirmation criterion.

Further additionally or alternatively, the green space processing robot can include at least one driven running wheel and at least one nondriven running wheel for the propulsion of the green space processing robot. At least the nondriven running wheel can be arranged in front of at least the driven running wheel in the propulsion direction. In particular, it can be in front in a preferred or main movement direction of the green space processing robot. Further additionally or alternatively, the propulsion in the propulsion direction can be a forward movement. Further additionally or alternatively, the output can be optical and/or acoustic and/or the transmission can be wired or wireless. Further additionally or alternatively, simply stopping or being stationary can also be conceivable or possible.

In one embodiment of the invention, the green space processing robot includes a propulsion framework, in particular a chassis, and/or a, in particular the, cover hood. The processing height is adjustable in relation to the propulsion framework and/or the cover hood. This enables protection from interference with the processing tool to be maintained by means of the propulsion framework and/or the cover hood. In particular, the propulsion framework and/or the cover hood, in particular with a part in front of the contact part and/or the processing tool, can be arranged above the contact part and/or the processing tool. Additionally or alternatively, the term "chassis frame" can be used synonymously for the term "chassis". Further additionally or alternatively, the term "protective hood" can be used synonymously for the term "cover hood". Further additionally or alternatively, the contact part and/or the processing tool can be arranged on an underside of the propulsion framework and/or the cover hood. Further additionally or alternatively, a height of the propulsion framework and/or a height of the cover hood do not have to be or cannot be adjustable. Further additionally or alternatively, the wording "with respect to" can be used synonymously for the term "in relation to".

In one refinement of the invention, the method includes: if the sticking presumption criterion and/or the sticking confirmation criterion is/are not met, in particular is/are no longer met, in particular unchanged or normal operation of the drive system for the propulsion of the green space processing robot and/or no initiation and/or ending of the sticking countermeasure. This enables the processing. In particular, the propulsion can be specified, in particular at the factory. Additionally or alternatively, the processing height does not have to be or cannot be increased, in particular it can be reduced.

The system according to the invention is for operating a, in particular the, autonomous mobile green space processing robot. The green space processing robot includes a, in particular the, drive system. The drive system is designed for a, in particular the, propulsion of the green space processing robot. The system includes a, in particular, the monitoring and operating device, and in particular the green space processing robot. In particular, the green space processing robot includes the monitoring and operating device. The monitoring and operating device is designed:

to monitor whether a, in particular the, sticking presumption criterion is met, wherein the sticking presumption criterion is characteristic of a suspected, in particular the suspected, sticking of the green space processing robot, if the sticking presumption criterion is met, to operate the drive system for a, in particular the, movement change of the green space processing robot and to monitor whether a, in particular the, sticking confirmation criterion is met, wherein the sticking confirmation criterion is that the movement change does not occur, and if the sticking confirmation criterion is met, to initiate a, in particular the, sticking countermeasure of the green space processing robot.

The system can enable the same advantage(s) as mentioned above for the method.

In particular, the system can be designed for the execution, in particular the automatic execution, of a, in particular the, method as mentioned above. Additionally or alternatively, the system can be a green space processing system. Further additionally or alternatively, the system and/or the monitoring and operating device can be electrical and/or include the sensor and/or a computing device and/or a processor and/or a microcontroller and/or a storage device and/or a computer. Further additionally or alternatively, the green space processing robot can be designed as mentioned above for the method. Further additionally or alternatively, the monitoring and operating device can include the height adjustment device.

Other objects, advantages and novel features of the present invention will become apparent from the following detailed description of one or more preferred embodiments when considered in conjunction with the accompanying drawings.

DETAILED DESCRIPTION OF THE DRAWINGS

FIGS. 1 to 7 show a system 20 and a method for operating an autonomous mobile green space processing robot 1.

The green space processing robot 1 includes a drive system 2. The drive system 2 is designed for propulsion of the green space processing robot 1, in particular propels it.

Figure 1:
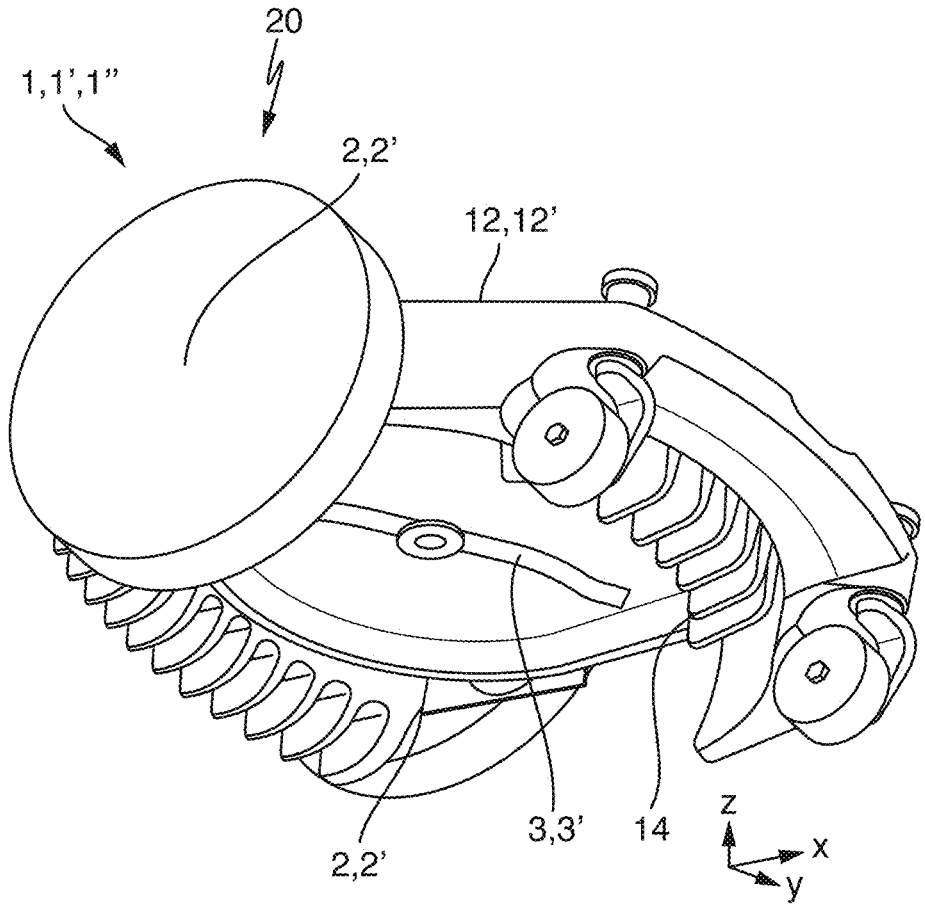
FIG. 1 shows a perspective view of a system according to an embodiment of the invention including an autonomous mobile green space processing robot.
Figure 2:
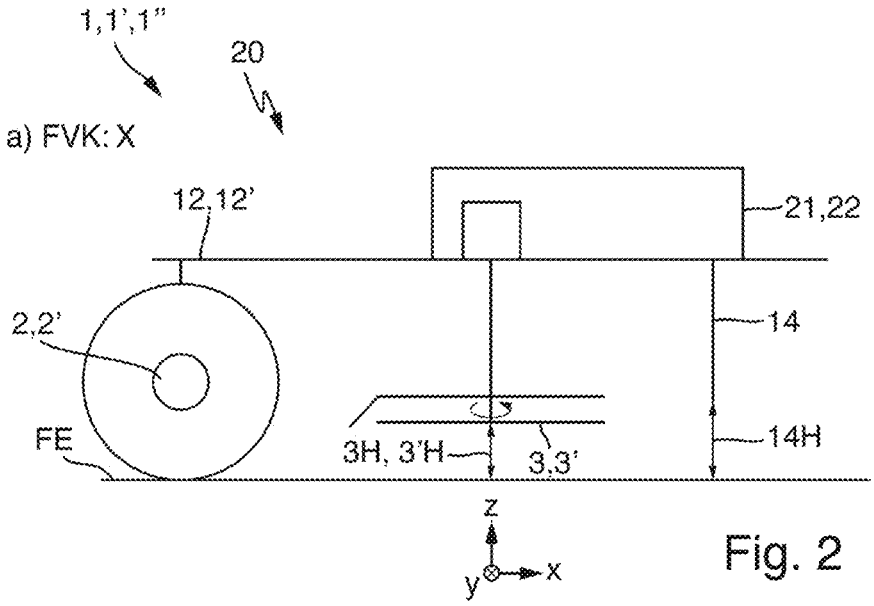
FIG. 2 shows a side view in section of the system of FIG. 1 and a method according to an embodiment of the invention for operating the autonomous mobile green space processing robot.
Figure 3:
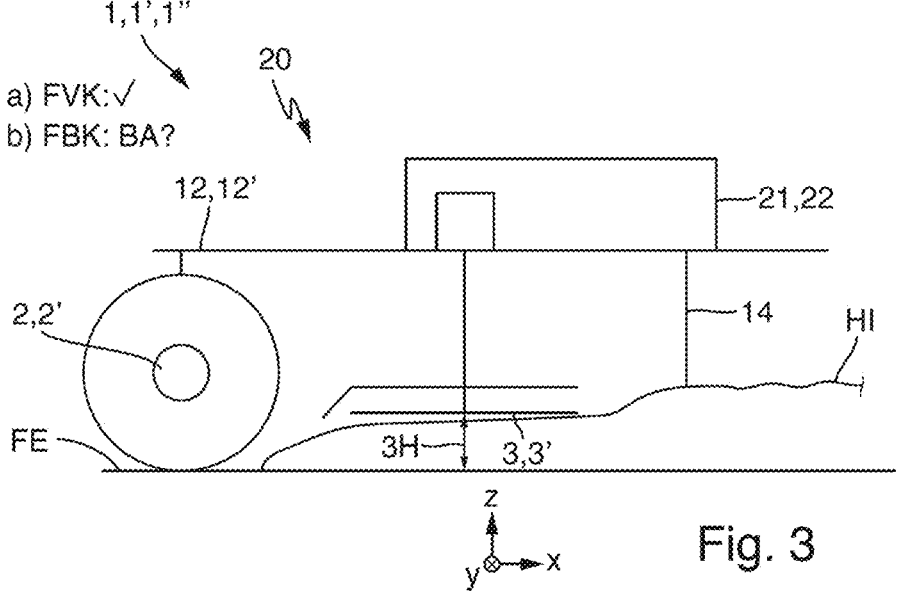
FIG. 3 shows a side view in section of the system of FIG. 1 and the method of FIG. 2 upon monitoring of suspected sticking of the green space processing robot.
Figure 4:
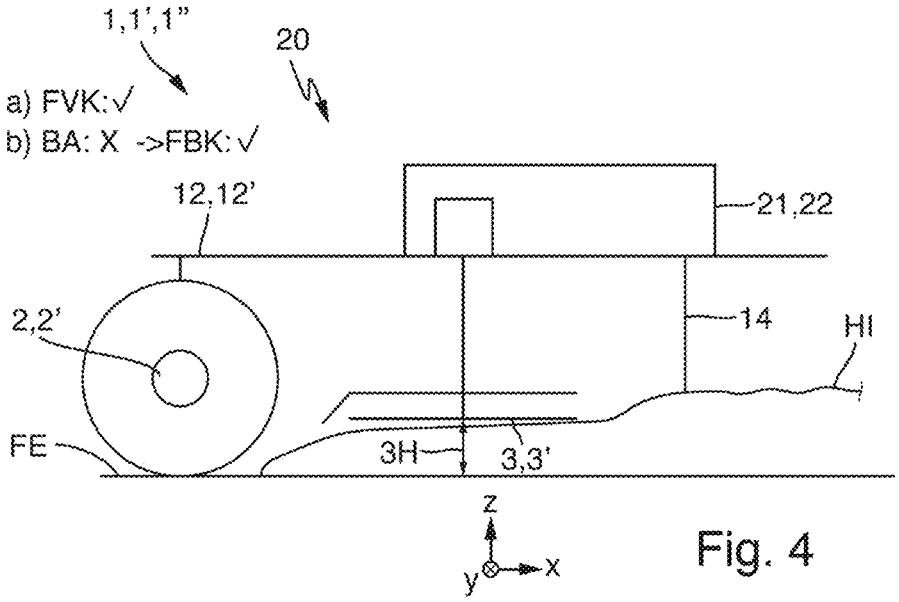
FIG. 4 shows a side view in section of the system of FIG. 1 and the method of FIG. 2 upon confirmation of the suspected sticking.
Figure 5:
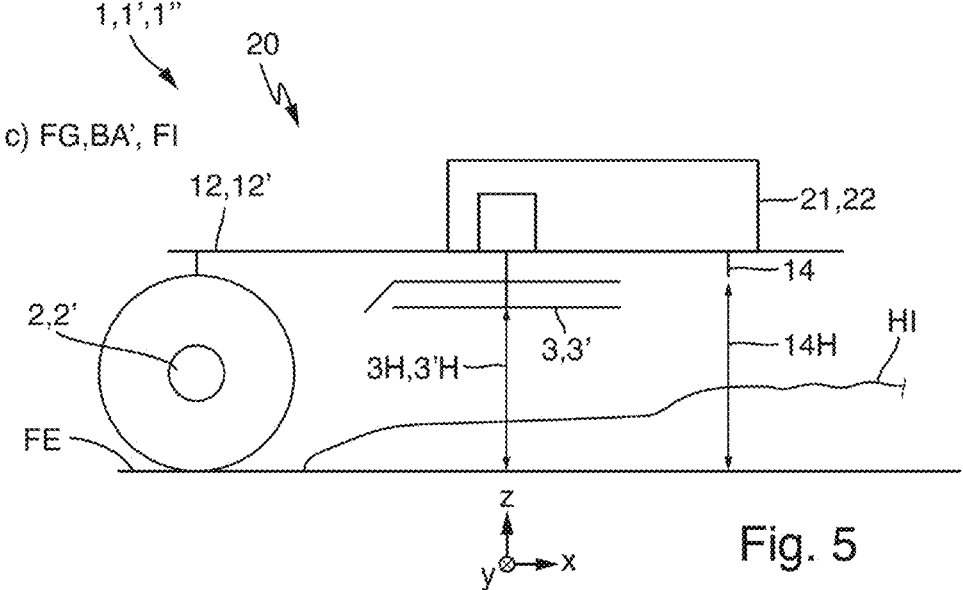
FIG. 5 shows a side view in section of the system of FIG. 1 and the method of FIG. 2 upon initiation of a sticking countermeasure including increasing a processing height of a processing tool of the green space processing robot.
Figure 6:
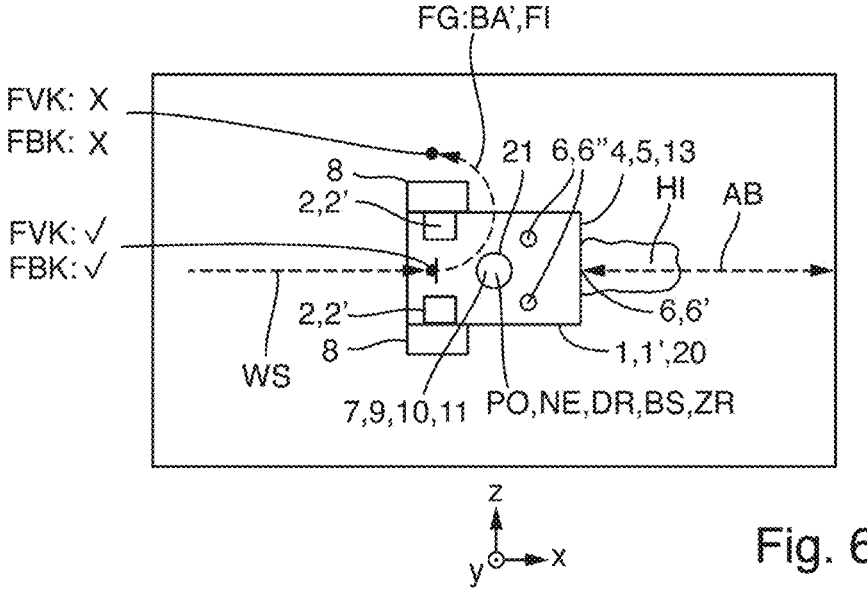
FIG. 6 shows a top view of the system of FIG. 1 and the method of FIG. 2 upon initiation of the sticking counter-measure including operating a drive system of the green space processing robot for a greater movement change in a modified propulsion direction of the green space processing robot.

The system 20 includes a monitoring and operating device 21, and in particular the green space processing robot 1. In particular, the green space processing robot 1 includes the monitoring and operating device 21. The monitoring and operating device 21 is designed to monitor whether a sticking presumption criterion FVK is met, in particular it monitors this, as shown in FIG. 2. The sticking presumption criterion FVK is characteristic of suspected sticking of the green space processing robot 1, as shown in FIG. 3. Fur-thermore, the monitoring and operating device 21 is designed, if the sticking presumption criterion FVK is met, to operate the drive system 2 for a movement change BA of the green space processing robot 1 and to monitor whether a sticking confirmation criterion FBK is met, in particular it operates and monitors these, as shown in FIG. 3. The sticking confirmation criterion FBK is that the movement change BA does not occur, as shown in FIG. 4. Moreover, the monitoring and operating device 21 is designed, if the sticking confirmation criterion FBK is met, to initiate a sticking countermeasure FG of the green space processing robot 1, in particular it initiates this, as shown in FIGS. 5 and 6.

The method includes the following steps: a) monitoring whether the sticking presumption criterion FVK is met, in particular by means of the monitoring and operating device 21; b) if the sticking presumption criterion FVK is met, operating the drive system 2 for the movement change BA of the green space processing robot 1 and monitoring whether the sticking confirmation criterion FBK is met, in particular by means of the monitoring and operating device 21; c) if the sticking confirmation criterion FBK is met, initiating the sticking countermeasure FG of the green space processing robot 1, in particular by means of the monitoring and operating device 21.

In detail, the green space processing robot 1 is a lawn-mowing robot 1', in particular including a lawnmowing tool 3'.

Furthermore, the green space processing robot 1 is designed as a drivable green space processing robot 1". Additionally or alternatively, the drive system 2 includes a traction drive system 2'. In particular, the drive system 2 is the traction drive system 2'. The traction drive system 2' is designed for a driving movement of the green space pro-cessing robot 1.

Moreover, step a) includes: operating the drive system 2 for the propulsion of the green space processing robot 1, in particular by means of the monitoring and operating device 21. In particular, step b) includes: changed operation of the drive system 2.

Furthermore, the sticking presumption criterion FVK is that a propulsion of the green space processing robot 1 cannot be inferred, in particular a bumper 4 of the green space processing robot 1 does not bump and/or a distance AB, a position PO, a route WS, and/or an inclination NE of the green space processing robot 1 does/do not change and/or the green space processing robot 1 does not experi-ence a rotation rate DR and/or an acceleration BE, in particular within a specified period of time ZR.

Moreover, the monitoring of step a) and/or step b) is executed by means of a bumper sensor 5, a distance sensor 6, in particular an ultrasonic sensor 6' and/or a magnetic field sensor 6", a position sensor 7, which is in particular global and/or local, an odometry sensor 8, which is in particular visual, an inclination sensor 9, a rotation rate sensor 10, and/or an acceleration sensor 11, of the green space pro-cessing robot 1.

Figure 8:
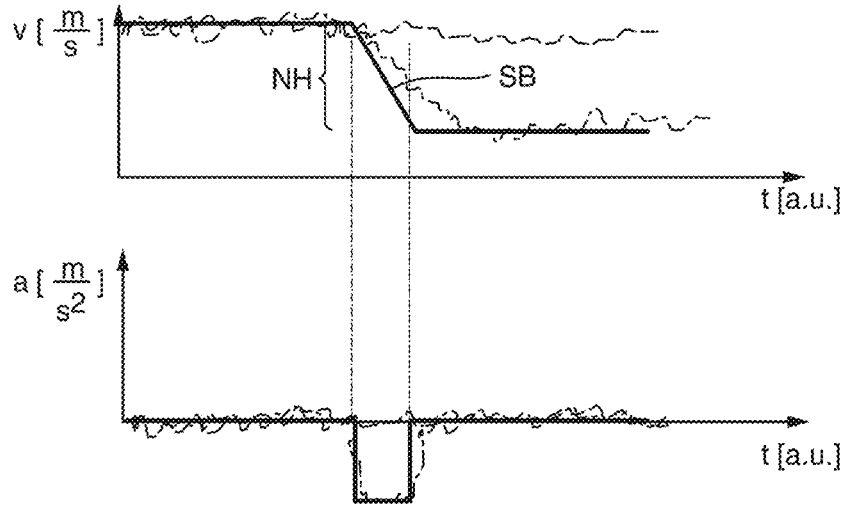
FIG. 8 shows, for the confirmation of the suspected sticking, operation of the drive system for a movement change of the green space processing robot using a negative stroke of a target velocity and having a target braking ramp.

Furthermore, the operation of the drive system 2 for the movement change BA is executed using a negative stroke NH of a target velocity SG, in particular of at most −0.6 m/s, in particular at most −0.3 m/s, and using a target braking ramp SB, in particular of at most —4 m/s², in particular at most −2 m/s², as shown in FIG. 8.

In the exemplary embodiment shown, the velocity v is not measured or detected or acquired, but rather the acceleration a, in particular by means of the acceleration sensor 11. The velocity v is calculated or ascertained via the measured acceleration a by integration, in particular single integration. In alternative exemplary embodiments, aside from/addition-ally to and/or instead of/alternatively to the braking ramp SB, an acceleration ramp, in particular a target acceleration ramp, is also conceivable or possible, wherein the diagram or FIG. 8 is reflected, in particular simply, in particular at the time axis t.

Moreover, the operation of the drive system 2 for the movement change BA and the sticking countermeasure FG are different, in particular qualitatively and/or quantitatively.

Furthermore, the green space processing robot 1 includes a processing tool 3, in particular the lawnmowing tool 3'. A processing height 3H of the processing tool 3 is adjustable. The sticking countermeasure FG includes: increasing the processing height 3H, in particular by means of a height adjustment device 22 of the monitoring and operating device 21, as shown in FIG. 5. Additionally or alternatively, the sticking countermeasure FG includes, in particular chrono-logically after the increase of the processing height 3H: operating the drive system 2 for a greater movement change BA', in particular twice as great, of the green space pro-cessing robot 1, in particular in modified, in particular opposite, propulsion direction −x, as shown in FIG. 6. Further additionally or alternatively, the sticking countermeasure FG includes, in particular chronologically after the operation of the drive system 2 for the greater movement change BA': outputting and/or transmitting user-perceptible sticking information FI.

In particular, the processing tool 3 is movable, in particular rotationally. The sticking countermeasure FG includes in particular: ending a movement of the processing tool 3.

Additionally or alternatively, the green space processing robot 1 includes a driving level FE, wherein the processing height 3H is above the driving level FE.

Further additionally or alternatively, the green space processing robot 1 includes a protective device 14. The protective device 14 is designed for protection from an intervention, in particular by a user, in the processing tool 3, and is in particular arranged in front of the processing tool 3. A protective height 14H of the protective device 14 is adjustable. The sticking countermeasure FG includes: increasing the protective height 14H, in particular by means of the height adjustment device 22. In particular, the protective device can include, in particular can be, a comb and/or cage, which is in particular oriented downward and/or open downward. Further additionally or alternatively, the protective device can include, in particular can be, a tool housing, in particular a mower cover housing, which is in particular oriented downward and/or open downward.

Moreover, the sticking of the green space processing robot 1 is with a contact part, in particular the processing tool 3 and/or the protective device 14, and/or on an obstacle HI.

Furthermore, the green space processing robot 1 includes a propulsion framework 12, in particular a chassis 12', and/or a cover hood 13. The processing height 3H is adjustable in relation to the propulsion framework 12 and/or the cover hood 13.

Figure 7:
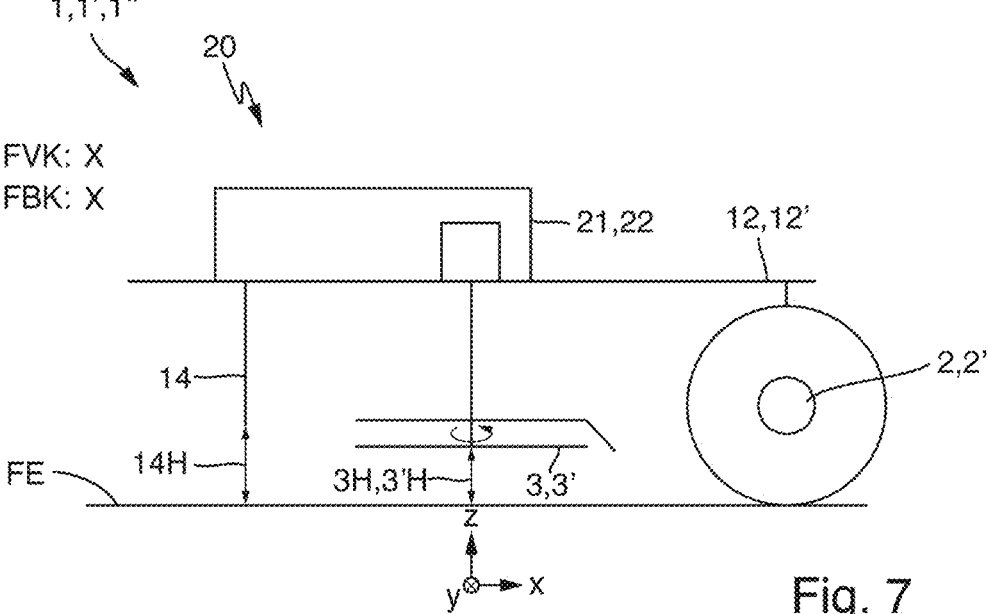
FIG. 7 shows a side view in section of the system of FIG. 1 and the method of FIG. 2 upon ending of the sticking countermeasure, in particular reducing the processing height.

Moreover, the method includes: if the sticking presumption criterion FVK and/or the sticking confirmation criterion FBK is/are not met, operating the drive system 2 for the propulsion of the green space processing robot 1 and/or not initiating and/or ending the sticking countermeasure FG, in particular by means of the monitoring and operating device 21, in particular reducing the processing height 3H and/or beginning the movement of the processing tool 3, as shown in FIG. 7.

As the exemplary embodiments shown and explained above make clear, the invention provides an advantageous method and an advantageous system, in particular for operating, in each case, an autonomous mobile green space processing robot which has improved properties.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating an autonomous mobile green space processing robot, wherein the green space processing robot includes a drive system for propulsion of the green space processing robot, the method comprising the steps of:
   a) monitoring whether a sticking presumption criterion is met, wherein the sticking presumption criterion is characteristic of suspected sticking of the green space processing robot;

b) when the sticking presumption criterion is met, operating the drive system for a movement change of the green space processing robot and monitoring whether a sticking confirmation criterion is met, wherein the sticking confirmation criterion is that the movement change does not occur, and further wherein the sticking presumption criterion and the sticking confirmation criterion are different; and
   c) when the sticking confirmation criterion is met, initiating a sticking countermeasure of the green space processing robot,
   wherein
   step a) includes: operating the drive system for the propulsion of the green space processing robot, and
   step b) includes: changing operation of the drive system.
2. The method according to claim 1, wherein
   the green space processing robot is a lawnmowing robot having a lawnmowing tool.
3. The method according to claim 1, wherein
   the green space processing robot is a drivable green space processing robot, and/or
   the drive system comprises a traction drive system, wherein the traction drive system is designed for a driving movement of the green space processing robot.
4. The method according to claim 1, wherein the sticking presumption criterion is that, within a specified period of time:
   a bumper of the green space processing robot does not bump, and/or
   a distance, a position, a route, and/or an inclination of the green space processing robot does/do not change, and/or
   the green space processing robot does not experience a rotation rate and/or an acceleration.
5. The method according to claim 1, wherein
   the sticking presumption criterion is that a propulsion of the green space processing robot cannot be inferred.
6. The method according to claim 4, wherein
   the monitoring of step a) and/or step b) is executed by one or more of: a bumper sensor, a distance sensor, an ultrasonic sensor, a magnetic field sensor, a position sensor, a global and/or local position sensor, an odometry sensor, a visual odometry sensor, an inclination sensor, a rotation rate sensor, or an acceleration sensor, of the green space processing robot.
7. A method for operating an autonomous mobile green space processing robot, wherein the green space processing robot includes a drive system for propulsion of the green space processing robot, the method comprising the steps of:
   a) monitoring whether a sticking presumption criterion is met, wherein the sticking presumption criterion is characteristic of suspected sticking of the green space processing robot;
   b) when the sticking presumption criterion is met, operating the drive system for a movement change of the green space processing robot and monitoring whether a sticking confirmation criterion is met, wherein the sticking confirmation criterion is that the movement change does not occur; and
   c) when the sticking confirmation criterion is met, initiating a sticking countermeasure of the green space processing robot,
   wherein the operation of the drive system for the movement change is executed using a negative stroke of a target velocity, and using a target braking ramp.

8. The method according to claim 7, wherein the negative stroke of the target velocity is at most −0.6 m/s or at most −0.3 m/s; and the target breaking ramp is at most −4 m/s$^2$ or at most −2 m/s$^2$.

9. The method according to claim 1, wherein the operation of the drive system for the movement change and the sticking countermeasure are different.

10. The method according to claim 1, wherein one or more of:

(i) the green space processing robot includes a processing tool, wherein a processing height of the processing tool is adjustable, wherein the sticking countermeasure includes:

increasing the processing height, (ii) the sticking countermeasure includes, chronologically after increasing the processing height: operating the drive system for a greater movement change of the green space processing robot in a modified propulsion direction, or (iii) the sticking countermeasure includes, chronologically after operating the drive system for the greater movement change: outputting and/or transmitting user-perceptible sticking information.

11. The method according to claim 10, wherein the greater movement change is at least twice as great, and the modified propulsion direction is an opposite direction.

12. The method according to claim 10, wherein the green space processing robot includes a propulsion framework and/or a cover hood, and the processing height is adjustable in relation to the propulsion framework and/or the cover hood.

13. The method according to claim 1, further comprising the step of:

when the sticking presumption criterion and/or the sticking confirmation criterion is/are not met, operating the drive system for the propulsion of the green space processing robot and/or not initiating and/or ending the sticking countermeasure.

14. A system for operating an autonomous mobile green space processing robot, wherein the green space processing robot includes a drive system for propulsion of the green space processing robot, the system comprising:

a monitoring and operating device, wherein the monitoring and operating device is configured to:

monitor whether a sticking presumption criterion is met, wherein the sticking presumption criterion is characteristic of suspected sticking of the green space processing robot, and wherein monitoring includes operating the drive system for the propulsion of the green space processing robot, when the sticking presumption criterion is met, change the operating of the drive system for a movement change of the green space processing robot and monitor whether a sticking confirmation criterion is met, wherein the sticking confirmation criterion is that the movement change does not occur, and further wherein the sticking presumption criterion and the sticking confirmation criterion are different, and when the sticking confirmation criterion is met, initiate a sticking countermeasure of the green space processing robot;

wherein the green space processing robot includes the monitoring and operating device.

\* \* \* \* \*